Nov. 24, 1931.  R. P. BROWN  1,833,153
METHOD OF AND MEANS FOR HEATING OIL
Filed Jan. 17, 1928    2 Sheets-Sheet 1
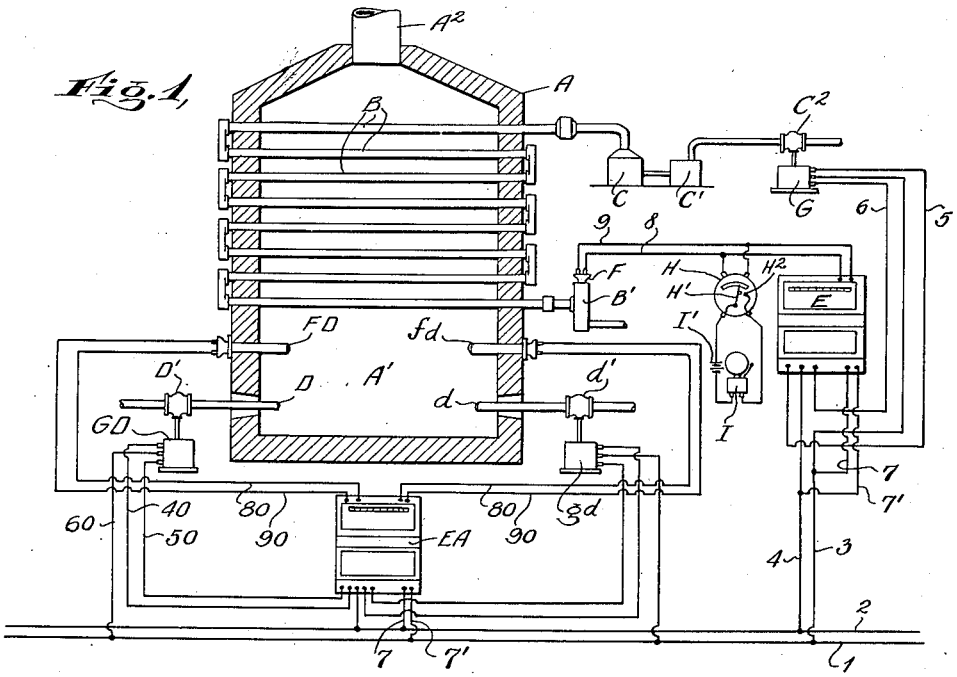
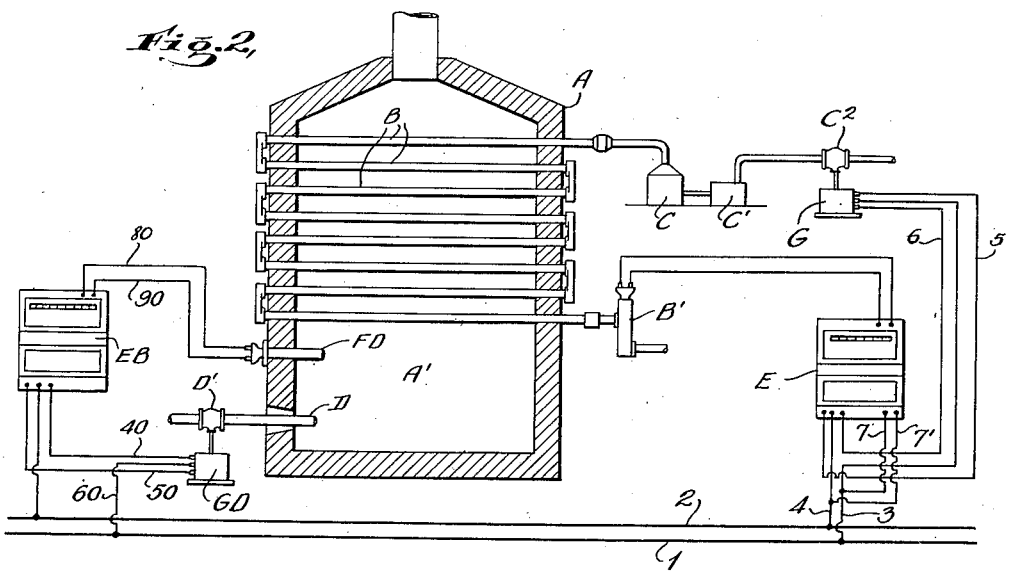
INVENTOR
RICHARD P. BROWN
BY
John E. Hubbell
ATTORNEY

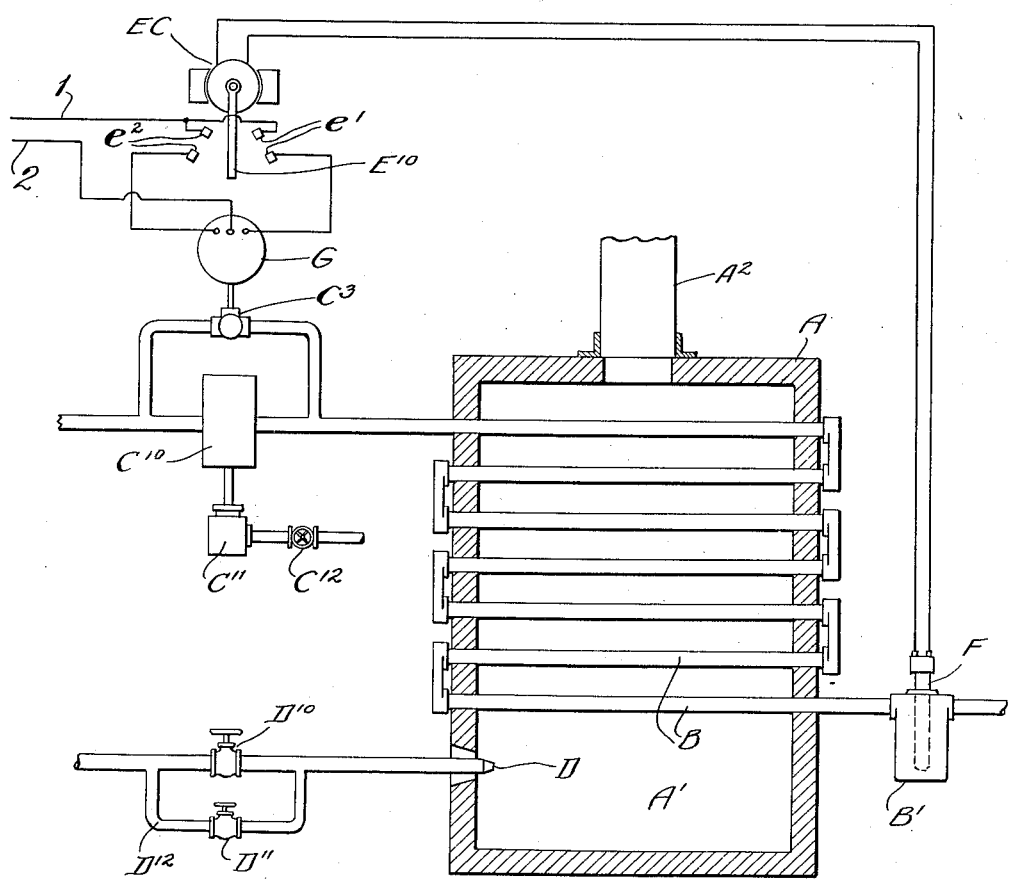

Patented Nov. 24, 1931

1,833,153

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION

METHOD OF AND MEANS FOR HEATING OIL

Application filed January 17, 1928. Serial No. 247,318.

The general object of the present invention is to provide an improved method of, and improved means for regulating the operation of a tube heater or still for continuously and progressively heating oil, and particularly for so heating oil to a refining temperature.

The invention is characterized by the regulation of the rate of combustion in the oil heater furnace so as to maintain desirable uniform furnace operating conditions, and by the regulation of the rate of oil flow through the heater so as to maintain an approximately constant heater delivery oil temperature.

In the preferred practical mode of carrying out the invention I employ thermostatic means responsive to the temperature of the oil at some point in its path of flow which preferably is near the heater oil outlet, and operating to increase or decrease the rate at which oil is passed through the heater, as the oil temperature to which said means responds rises above, or falls below a predetermined temperature. In some cases I also employ means automatically responsive to a condition of furnace operation, for example thermostatic means responsive to a furnace temperature condition for varying the rate of fuel supply as required to maintain approximately constant furnace operating conditions. With an ordinary oil heating furnace burning fluid fuel, and particularly oil, very uniform operating conditions can be maintained without any automatic control of the fuel supply valves or other combustion regulating devices.

As compared with methods of regulation heretofore developed in which the rate of combustion is increased or decreased in response to changes in the temperature to which the oil is heated so as to maintain that temperature approximately constant, regulation in accordance with the present invention possesses an important practical advantage in that it avoids fluctuations in furnace temperature which of themselves may tend to produce quite wide variations in the exit oil temperature, and tend to decrease furnace efficiencies, and increase the maximum furnace temperatures and thereby tend to local overheating of the tube walls and the oil contact therewith.

Regulation giving constant furnace operation conditions, with a variation in oil throughput to correct for variations in the oil exit temperature, tends, in general, to a quicker and more accurate correction for a variation in exit oil temperature than can be secured when the correction is made by varying the furnace rate of combustion. Any change in the rate of oil throughput tends to an immediate change in temperature at all points along the path of oil flow. In practice, moreover, it is ordinarily appreciably easier to maintain approximately constant furnace operating conditions than to maintain an approximately constant oil throughput. In consequence, fluctuations in exit oil temperature are due in part, to fluctuations in the rate of oil flow which, to a considerable extent, are self compensating, and may advantageously be minimized by the automatic control of the oil flow herein provided for.

The maintenance of uniform furnace operating conditions herein before contemplated does not preclude variations in the rate of combustion and in the furnace temperatures maintained, to compensate for such changes in operating conditions as the gradual decrease in tube heat transfer rate as carbon deposits of increasing thickness are formed on the inner walls of the tubes. As such deposits thicken, the rate of combustion may well be increased normally or automatically, to minimize the reduction in heater capacity which such deposits tend to produce.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have described and illustrated preferred embodiments of my invention.

Of the drawings:

Fig. 1 is a diagrammatic representation of a continuous oil heater or tube still provided with one form of my improved control provisions;

Fig. 2 is a view taken similarly to Fig. 1 illustrating a second form of control provisions; and Fig. 3 is a view taken similarly to Fig. 1 illustrating a third form of control provisions.

In Fig. 1 I have diagrammatically illustrated an embodiment of the present invention including a tube oil heater or a tube still A of conventional type. As shown, the heater A comprises a furnace combustion chamber A' beneath a bank of horizontal tubes B which are swept by the heating gases passing from the combustion chamber A' to the furnace stack outlet A². The tubes B are connected at their ends so that the oil passes successively through tubes B at successively lower levels from an upper oil inlet to a lower oil outlet. The oil to be refined is supplied to the heater oil inlet, by a fuel pump C driven by a motor C', shown as a steam motor, at a speed depending on the adjustment of a regulating valve C² in the steam supply line to the motor. The heater A is heated by the combustion of fuel separately supplied to different portions of the combustion chamber A' by suitably spaced apart burners. As shown, there are two such burners D and d, one at each side of the combustion chamber. In the arrangement shown, fluid fuel, which ordinarily is oil, is supplied to the burners D and d from a suitable pressure source (not shown) at a rate depending on the adjustment of fuel supply regulating valves D' and d'.

The valve C² is adjusted to increase and decrease the rate at which oil is passed through the tubes B by the pump C, as the temperature to which the oil is heated in passing through the tubes falls below or rises above a predetermined temperature. This result is obtained with the form of the construction illustrated in Fig. 1, by means of a reversible electric motor G energized for operation in one way to open the valve C² and increase the speed of the pump C, and for operation in the opposite direction to close the valve C² and decrease the pump speed, by means of a pyrometer controller E which is responsive to the temperature to which the oil is heated in passing through the tubes B.

The controller E is thus made responsive to the heater oil exit temperature by means of a thermo-couple F inserted in a thermometer well B' in the path of oil flow at or adjacent the heater oil outlet. The terminals of the thermo-couple F are connected by conductors 8 and 9 to corresponding terminals of the pyrometer controller E. As shown, one terminal of the motor G is connected by a conductor 3 to the conductor 1 forming one side of an electric current supply or power circuit. The controller E operates in response to the potential developed by the thermo-couple F to connect one terminal 6 of the motor G to the conductor 2 of the power circuit through a conductor 4 and thereby cause the motor G to rotate in a direction to throttle the flow through the valve C² when the temperature to which the thermo-couple F is subjected falls below the predetermined oil temperature desired. Conversely, when the temperature to which the thermo-couple F is subjected exceeds said predetermined oil temperature the pyrometer controller E connects a second terminal 5 of the motor G to the conductor 4 and thereby to the supply conductor 2 whereupon the motor G rotates in the direction to open or increase the flow through the valve C².

The pyrometer controller E may be of any usual or suitable form of instrument for the purpose. In general it includes a voltmeter like the voltmeter EC of Fig. 3, having its terminals connected to those of the thermo-couple F, and includes a switch mechanism controlled by the voltmeter pointer and serving to connect the motor terminal 6 to the conductor 4 when the oil temperature is below the predetermined value, and to connect the motor terminal 5 to the conductor 4 when the oil temperature is above the predetermined value. The switch mechanism in an instrument of this type is ordinarily actuated by a motor or other relay which may be energized from the supply conductors 1 and 2 through the conductors 7 and 7'. I have not thought it necessary to illustrate and describe in detail the construction of the pyrometer controller E for the reason that the present invention does not depend on the specific form of the controller, and because various forms of control instruments suitable for the purpose are known. For example, the controller E may be of the type disclosed in the patent to Brown No. 1,355,448, granted October 12, 1920.

In the particular embodiment of my invention illustrated in Fig. 1, means are provided for automatically adjusting each of the valves D' and d' as required to maintain an approximately constant temperature in the portion of the combustion chamber A' into which the corresponding burner opens. To this end I locate a thermo-couple FD in the combustion chamber A' in proximity to the burner D, and locate a thermo-couple fd in the combustion chamber A' in proximity to the burner d. The valves D' and d' are operated by reversible motors GD and gd, respectively. The motor GD is controlled by the thermo-couple FD, and the motor gd is controlled by the thermo-couple fd. The control provisions through which each of the thermo-couples FD and fd controls the corresponding burner may be identical with those previously described through which the thermo-couple F controls the motor G.

In practice, however, I prefer to employ in lieu of a separate pyrometer controller in conjunction with each of the thermo-couples FD and fd, a multiple controller EA to which each of the thermo-couples FD and fd may be connected as the thermo-couple F is connected to the controller E, and to which each of the motors GD and gd may be connected as the motor G is connected to the controller E. The controller EA may be of well known type, and need not differ from the controller E except that it includes a switch mechanism for connecting the controller voltmeter to the thermo-couple FD and to the thermo-couple fd in regular alternation at intervals of a minute or so. At the same time at which the thermo-couple FD is connected to the controller EA, the control provisions of the controller EA are connected to the conductors 50 and 60 pertaining to the motor GD, and the control provisions of the controller EA are connected to the corresponding conductors pertaining to the motor gd when the thermo-couple fd is operatively connected to the controller.

With the apparatus shown in Fig. 1, fuel is supplied to the burners D and d as required to maintain the temperature in these portions of the combustion chamber approximately constant and insures, of course, an approximately constant general combustion chamber temperature. In consequence, fuel is supplied to the burners D and d as required to subject the tubes B to an approximately constant heating effect. The thermo-couple F with the associated control provisions regulates the supply of oil to be heated as required to insure an approximately constant oil exit temperature. Furthermore, the means provided for separately regulating the supply of fuel to the burners D and d tend to uniform distribution of fuel between the burners and to a desirable uniformity in the temperature of different portions of the combustion chamber.

In some cases it may be desirable to provide a signal device to light a lamp or ring a bell when, as because of some abnormal condition, the control provisions fail to prevent the oil exit temperature from becoming unduly high. In Fig. 1 I have illustrated a signal device for this purpose comprising a voltmeter H connected in parallel with the controller E and arranged to have its pointer H' close a signal circuit on a predetermined increase in the exit temperature above that normally maintained. As shown in Fig. 1, the signal circuit includes a bell I, a source of current I', and a contact $H^2$ engaged by the pointer H' on a predetermined rise in temperature.

When as is usually the case, an oil heater furnace is provided with more than two burners, the distribution of the fuel burned by the different burners may be effected by control provisions analogous to those shown in Fig. 1 including a thermo-couple for measuring the combustion chamber temperature adjacent each of the different burners and a multiple controller operatively related with each such thermo-couple and with the corresponding fuel valve relay motor in the same manner as the two thermo-couples FD and fd, and the two motors GD and gd are associated with the controller EA of Fig. 1.

The general method of controlling the rate of flow through the heater tubes in response to the heater exit oil temperature, and of controlling the supply of fuel to the combustion chamber in response to the combustion chamber temperature, may be employed, of course, when the combustion chamber has but a single burner, or when if there be a plurality of burners, the feed of oil to each burner is controlled in response to a single furnace thermo-couple. Fig. 2 shows an arrangement of the type just referred to in which a single thermo-couple FD operates through a controller EB to control a motor GD for adjusting a valve D' which directly controls all of the fuel supplied to the combustion chamber A'.

In the mode of practicing the present invention illustrated in Fig. 3, the rate of oil flow is automatically controlled, but the rate of combustion is controlled by manual adjustment of two valves $D^{10}$ and $D^{11}$. The valve $D^{10}$ is in the pipe supplying fuel to the burner D, and the valve $D^{11}$ is in a by-pass $D^{12}$ about the valve $D^{10}$. In Fig. 3, the rate of oil flow through the heater is regulated by the adjustment of a valve $C^3$ in a by-pass about the oil pump $C^{10}$. The latter is driven by a steam motor $C^{11}$ at a normally constant speed, determined by the adjustment of a valve $C^{12}$ in the steam supply pipe for the motor $C^{11}$. The by-pass valve $C^3$ is automatically opened and closed, as the exit oil temperature falls and rises, by means of a valve adjusting motor G controlled by an exit oil thermo-couple F through a control instrument EC. The latter is shown as a galvanometer having its terminals connected to those of the thermo-couple F, and is diagrammatically shown as having its pointer $E^{10}$ arranged to bridge contacts $e'$ or $e^2$, accordingly as the pointer deflects in one direction or the other from a normal neutral position. When the contacts $e'$ are connected by the pointer $E^{10}$, the motor G is energized by the supply conductors 1 and 2, for operation in one direction, and when the contacts $e^2$ are connected, the motor is energized for operation in the opposite direction.

Any of the forms of automatic controllers E, EA, etc. illustrated herein, may have provisions such, for example, as those illustrated in the copending joint application of Frederick W. Side and myself, Serial No. 82,881, filed January 21, 1926, for making the extent of movement imparted to the controller motor on each actuation of the controller greater when the deflection of the controller voltmeter from its neutral control position is relatively large, than when said deflection is relatively small.

Where the type of oil burners employed and the conditions regulating the supply of combustion air to the combustion chamber are not adapted to make the supply of combustion supporting air vary as required to maintain a sufficiently uniform fuel and air ratio, provisions may be made for adjusting air supply regulating dampers or valves as and when the burner regulating valves D' and d' are adjusted. I have not thought it necessary to illustrate such provisions as they will not be required in many cases, and moreover those provisions may be duplicates of those employed to control the valves D' and d'.

This application is in part a continuation of each of my prior applications Serial No. 52,740, filed August 27, 1925, and Serial No. 84,077, filed January 27, 1926, and certain novel methods and features of construction and arrangement disclosed but not claimed herein are claimed in my prior application Serial No. 140,539, filed October 9, 1926, as a division of said application Serial No. 84,077.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. In the operation of a tube oil heater for continuously heating oil to a refining temperature, the method which consists in regulating the rate of combustion to maintain approximately constant furnace operating conditions, and adjusting the rate at which oil is passed through the heater as required to maintain an approximately constant exit oil temperature.

2. In the operation of a tube oil heater for continuously heating oil to a refining temperature, the method which consists in regulating the rate of combustion to maintain approximately constant furnace operating conditions, and increasing and decreasing the rate at which oil is passed through the heater in response to increases and decreases from a predetermined value of the temperature to which the oil is heated.

3. In a tube oil heater, the combination of means for regulating the rate of combustion therein, and means responsive to variations in the temperature to which the oil is heated for regulating the rate of oil flow through said heater to thereby maintain an approximately constant heater exit oil temperature.

4. In the operation of an oil heater for continuously heating oil to a refining temperature, the method which consists in regulating the rate of combustion in the heater and the rate at which oil to be heated is supplied to the heater relatively to one another in automatic response to the temperature attained by the oil in the heater and to the temperature in the combustion chamber of the heater to thereby maintain an approximately constant oil temperature at the heater exit, and to maintain an approximately constant temperature in said combustion chamber.

5. The method of heating oil to a refining temperature in a tube heater which consists in approximating a predetermined exit oil temperature and a predetermined combustion chamber temperature by regulating the rate at which oil is passed through the heater tubes in automatic response to oil temperature variations, and regulating the combustion of fuel burned in said chamber to heat the oil in automatic response to variations in the temperature in said chamber.

6. In a tube oil heater, the combination of means responsive to the combustion chamber temperature for regulating the rate of combustion in said chamber, and means responsive to the temperature to which the oil is heated for regulating the relation between the rate of combustion and the rate of oil feed.

7. In a tube oil heater, the combination with a multiplicity of burners, of means responsive to the temperature to which the oil is heated for regulating the ratio between the aggregate rate of combustion of fuel supplied by said burners, and the rate of oil feed, and means responsive to the combustion chamber temperature at points adjacent the different burners for controlling the supply of fuel to the different burners.

8. In a tube oil heater, the combination of means regulating the rate at which oil is passed through the heater tubes, means responsive to the temperature to which the oil is heated controlling said regulating means, and means responsive to the combustion chamber temperature for regulating the rate of combustion therein.

Signed at Philadelphia, in the county of Philadelphia and State of Pennsylvania, this 12 day of January, A. D. 1928.

RICHARD P. BROWN.